United States Patent
Verwys

(10) Patent No.: US 12,043,300 B2
(45) Date of Patent: Jul. 23, 2024

(54) MOTORCYCLE DOLLY

(71) Applicant: Paul Verwys, Grand Rapids, MI (US)

(72) Inventor: Paul Verwys, Grand Rapids, MI (US)

( * ) Notice: Subject to any disclaimer, the term of this patent is extended or adjusted under 35 U.S.C. 154(b) by 279 days.

(21) Appl. No.: 16/811,867

(22) Filed: Mar. 6, 2020

(65) Prior Publication Data

US 2020/0385042 A1 Dec. 10, 2020

Related U.S. Application Data

(60) Provisional application No. 62/814,671, filed on Mar. 6, 2019.

(51) Int. Cl.
*B62B 3/02* (2006.01)
*B62B 5/00* (2006.01)

(52) U.S. Cl.
CPC .............. *B62B 5/0093* (2013.01); *B62B 3/02* (2013.01); *B62B 2202/90* (2013.01); *B62B 2206/02* (2013.01)

(58) Field of Classification Search
CPC ..... B62B 5/0093; B62B 3/02; B62B 2206/02; B62B 3/06; B62B 3/04
See application file for complete search history.

(56) References Cited

U.S. PATENT DOCUMENTS

| | | | |
|---|---|---|---|
| 2,943,863 A * | 7/1960 | Corey | B60P 3/127 280/47.131 |
| 3,655,082 A * | 4/1972 | Garrett | B60R 9/06 414/462 |
| 4,505,495 A * | 3/1985 | Foss | B62B 3/02 16/113.1 |
| 5,228,712 A | 7/1993 | Speier | |
| 5,505,495 A * | 4/1996 | Godeau | F16L 47/02 285/331 |
| 5,609,461 A * | 3/1997 | Lichtenberg | B60P 3/07 280/79.11 |
| 6,095,746 A | 8/2000 | Bergin | |
| 6,287,069 B1 * | 9/2001 | Oliphant | B25H 1/0014 414/426 |
| 6,428,035 B1 | 8/2002 | Maxwell | |
| 6,634,849 B2 | 10/2003 | Clary | |
| 7,278,647 B1 | 10/2007 | Keenan | |
| 7,325,816 B2 | 2/2008 | Johnson | |
| 8,777,544 B1 | 7/2014 | Carpenter | |
| 8,851,240 B1 * | 10/2014 | Scoggins | B60T 3/00 188/32 |
| 9,421,835 B2 * | 8/2016 | Kao | A63C 17/265 |
| D793,645 S * | 8/2017 | Morgan | D34/23 |
| 10,124,846 B1 * | 11/2018 | Liu | B62B 5/0093 |
| 2004/0251645 A1 * | 12/2004 | Morin | A63C 11/001 280/22.1 |

FOREIGN PATENT DOCUMENTS

CN 201659997 U * 12/2010

* cited by examiner

*Primary Examiner* — Jason D Shanske
*Assistant Examiner* — James J Triggs
(74) *Attorney, Agent, or Firm* — CHERSKOV FLAYNIK & GURDA, LLC

(57) ABSTRACT

The invention provides a motorcycle dolly, the dolly having an elongated surface with a first end and the second end, wherein the surface defines a first section in rotatable or slidable communication with a second section; and a first plurality of wheels proximal to the first end and a second plurality of wheels proximal to the second end.

13 Claims, 12 Drawing Sheets

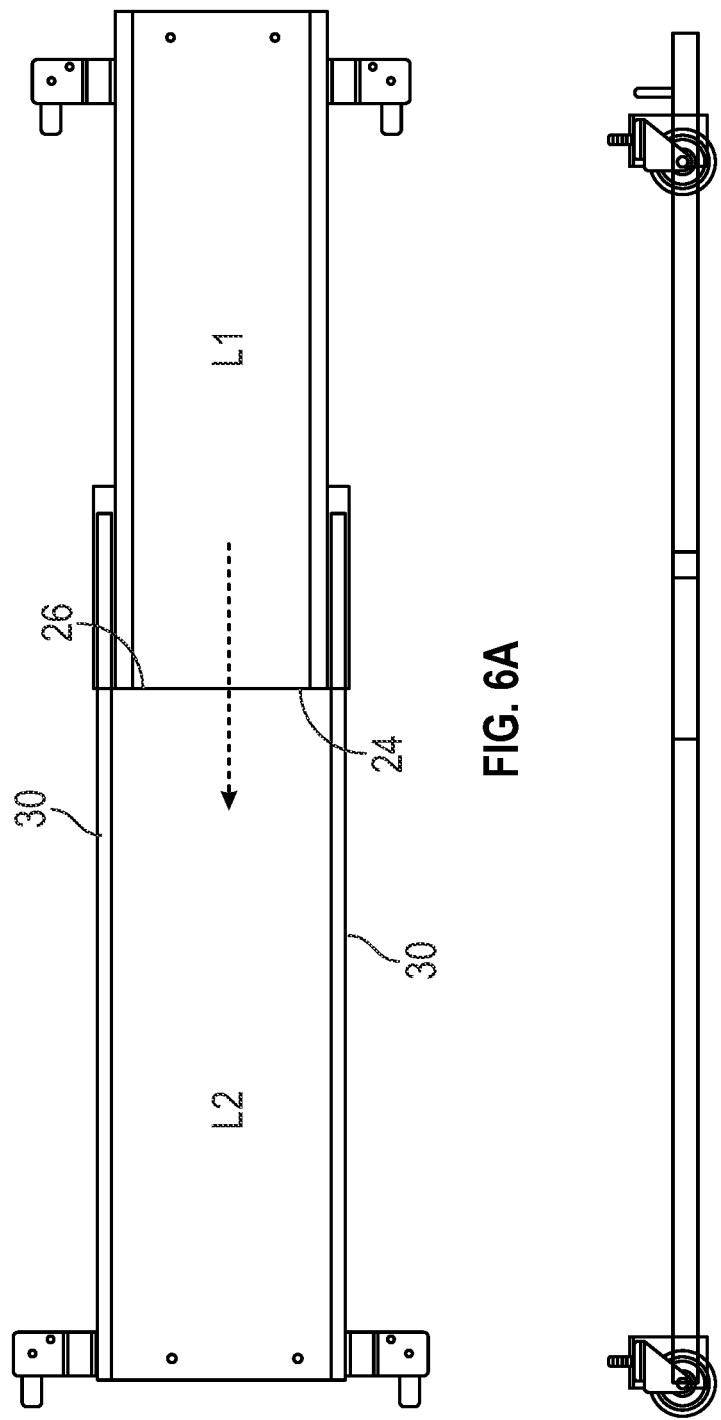

Telescoping Model Slid
together for Shipping/Storage

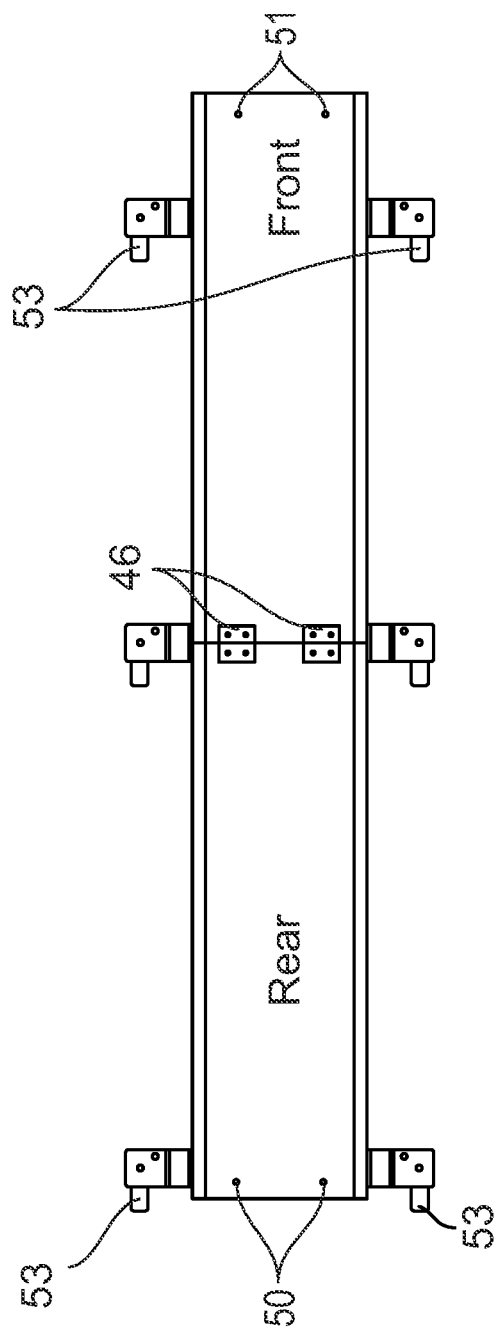
FIG. 8C
FIG. 8D
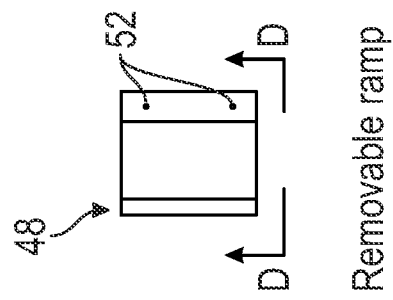

MOTORCYCLE DOLLY

PRIORITY

This utility patent application claims the benefit of U.S. Provisional Patent Application No. 62/814,671, filed on Mar. 6, 2019, the entirety of which is incorporated herein by reference.

BACKGROUND OF THE INVENTION

1. Field of the Invention

This invention relates to motorcycle dollies, and more specifically this invention relates to a device and method for storing a motorcycle and its associated carrier dolly.

2. Background of the Invention

Motorcycles can be heavy. Typically, motorcycles weigh between 250 and 500 pounds. However, super large motorcycles such as the Harley Glide Ultra and the Honda Goldwing, can approach 1000 pounds. Maneuvering these bikes during operation (i.e., driving it, or while the engine is running) is not an issue. However, when the machine is turned off, positioning it in a garage, showroom or semi-permanent parking situation is arduous.

Motorcycle dollies exist to help in positioning a motorcycle that is not running. However, given the high weight of some of these bikes, the dollies need to be constructed of robust materials. This results in heavy, bulky dollies. So not only does the biker have to deal with a heavy bike, but the dolly needs to be manipulated when loaded and then stowed afterwards.

Many dollies weigh between 150 and 200 pounds. This is out of necessity given their function to transport, and perhaps redirect static, heavy motor bikes. However, given the changing demographics of motorcycle riders, wherein upwards of 20 percent of bike purchases now are made by women, such heavy dollies are not gender friendly.

A need exists in the art for a dolly that is both robust in function, yet petite in stowage. The dolly should accommodate the smallest and the largest of bikes. Also, the dolly should be foldable to accommodate the smallest of stowage spaces or even wall hangers. The dolly should also be lockable in different configurations, so as to prevent rolling during transport.

SUMMARY OF INVENTION

An object of the invention is to provide a system and method for moving motorcycles that are not operating that overcomes many of the drawbacks of the prior art.

Another object of the invention is to provide a system and method for moving motorcycles. A feature of the invention is that it comprises a lightweight, yet foldable elongated ramp. An advantage of the invention is that it accommodates a variety of motorcycle sizes and weights, while also conferring stowability to the invention when not in use.

Still another object of the invention is to provide an easily configured motorcycle dolly. A feature of the invention is that it can be folded without the need for special tools. Another feature is that the dolly can be used with any wheel chock. An advantage of the invention is that its modularity and light weight features enable handling and stowage by someone with average strength and mechanical aptitude.

Briefly, the invention provides dolly comprising an elongated surface with a first end and the second end, wherein the surface defines a first section in rotatable communication with a second section; and a first plurality of wheels proximal to the first end and a second plurality of wheels proximal to the second end.

BRIEF DESCRIPTION OF DRAWING

The invention together with the above and other objects and advantages will be best understood from the following detailed description of the preferred embodiment of the invention shown in the accompanying drawings, wherein:

FIG. 6A is a plan view of a nearly fully deployed dolly having a telescoping extension feature, in accordance with features of the present invention;

FIG. 6B is a side view of the deployed dolly depicted in FIG. 6A;

FIG. 8C is a plan view of a fully deployed dolly with detached ramp, in accordance with features of the present invention;

FIG. 8D is a view of FIG. 8C taken along line D-D;

DETAILED DESCRIPTION OF THE INVENTION

The foregoing summary, as well as the following detailed description of certain embodiments of the present invention, will be better understood when read in conjunction with the appended drawings.

All numeric values are herein assumed to be modified by the term "about", whether or not explicitly indicated. The term "about" generally refers to a range of numbers that one of skill in the art would consider equivalent to the recited value (e.g., having the same function or result). In many instances, the terms "about" may include numbers that are rounded to the nearest significant figure.

The recitation of numerical ranges by endpoints includes all numbers within that range (e.g. 1 to 5 includes 1, 1.5, 2, 2.75, 3, 3.80, 4, and 5).

The following detailed description should be read with reference to the drawings in which similar elements in different drawings are numbered the same. The drawings, which are not necessarily to scale, depict illustrative embodiments and are not intended to limit the scope of the invention.

As used herein, an element or step recited in the singular and preceded with the word "a" or "an" should be understood as not excluding plural said elements or steps, unless such exclusion is explicitly stated. As used in this specification and the appended claims, the term "or" is generally employed in its sense including "and/or" unless the content clearly dictates otherwise.

Furthermore, references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

The invention provides an easily configured motorcycle dolly. Salient features of the dolly include a means for folding the dolly to approximately half its length for easier storage. This folding feature is effected without the need for specialized or even common tools.

Also, the invented dolly can be used with any wheel chock which reversibly attaches to either end of the dolly or at any point between the ends of the dolly. More than one wheel chock may be used at the same time on the same dolly, for example to sandwich a motorcycle therebetween. The dolly is designed so that a motorcycle may be loaded/unloaded from either end of the dolly.

Figure 1:
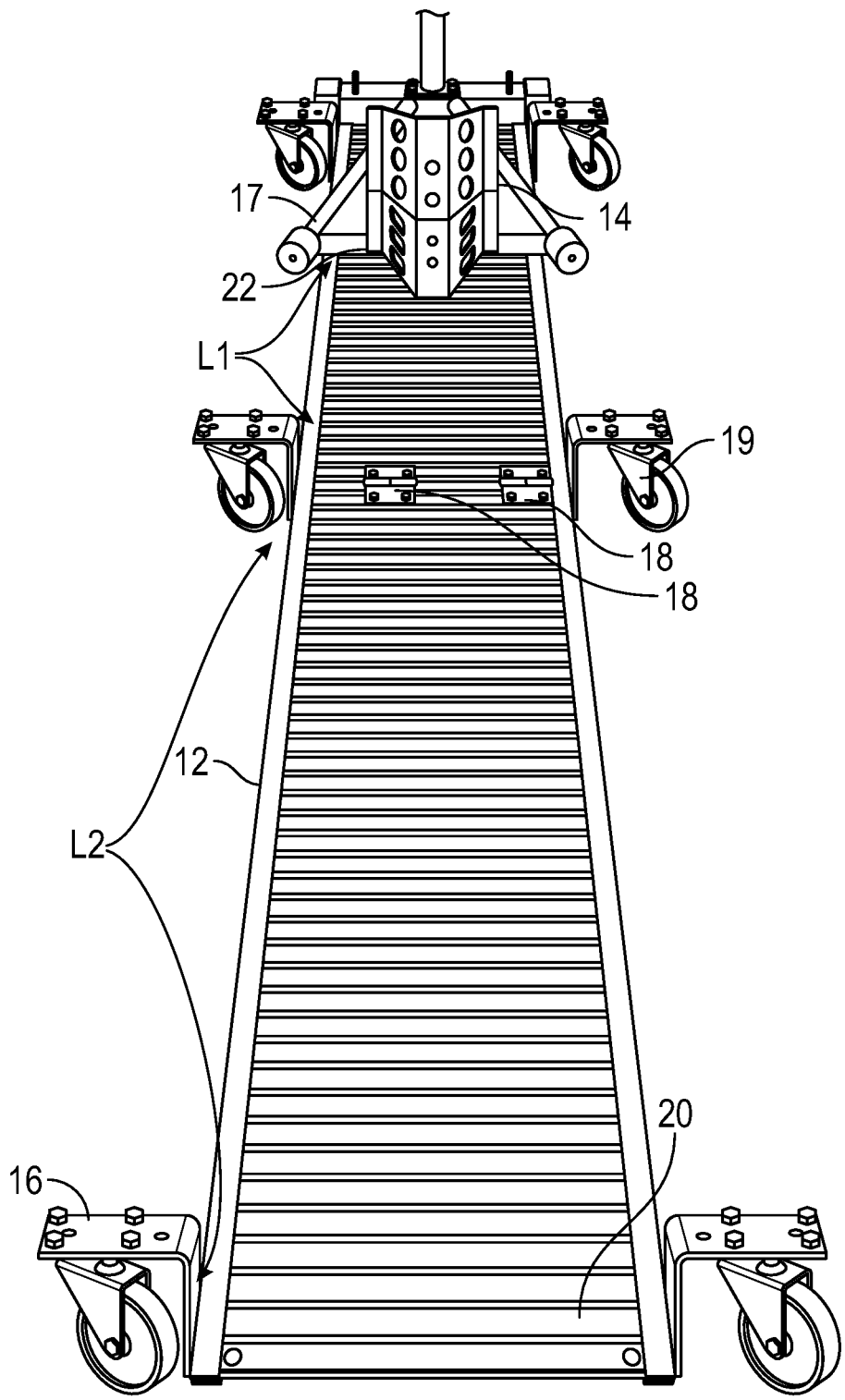
FIG. 1 is a photograph of a perspective view of a deployed dolly, in accordance with features of the present invention.

FIG. 1 is an isometric view of the invented dolly, generally designated as numeral 10. The dolly comprises an elongated substrate 12 serving as a ramp, the substrate having a first end 20 and a second end 22. The first end 20 of the ramp has a first pair of wheels 16 while the second end 22 of the ramp has a second pair of wheels 17. The elongated substrate has a first upwardly facing surface adapted to receive a motorcycle or other rolling stock. The elongated substrate as a second downwardly facing surface that is generally planar so as to oppose a generally planar floor, driveway or other support surface.

Positioned proximal to the second end is a wheel chock 14. The chock may be removably received by the first end or the second end. Alternatively, the wheel chock may be slidably received by the side rail of the dolly so as to squeeze or otherwise immobilize undersized bikes on the ramp.

Engagement means for reversibly fastening the chock 14 to the ramp may include a snap-fit assembly, threaded bold and aperture configurations. For example, the chock may define a plurality of flanges, each defining an aperture, adapted to reversibly receive an upward extending rod located at either or both ends of the dolly. Conversely, the chock may comprise a downwardly depending rod to insert within an aperture located at predetermined points on the dolly. In an embodiment of the invention, the wheel chock only goes on one end, and fits over the two existing pins to secure the wheel chock in place.

Figure 2:
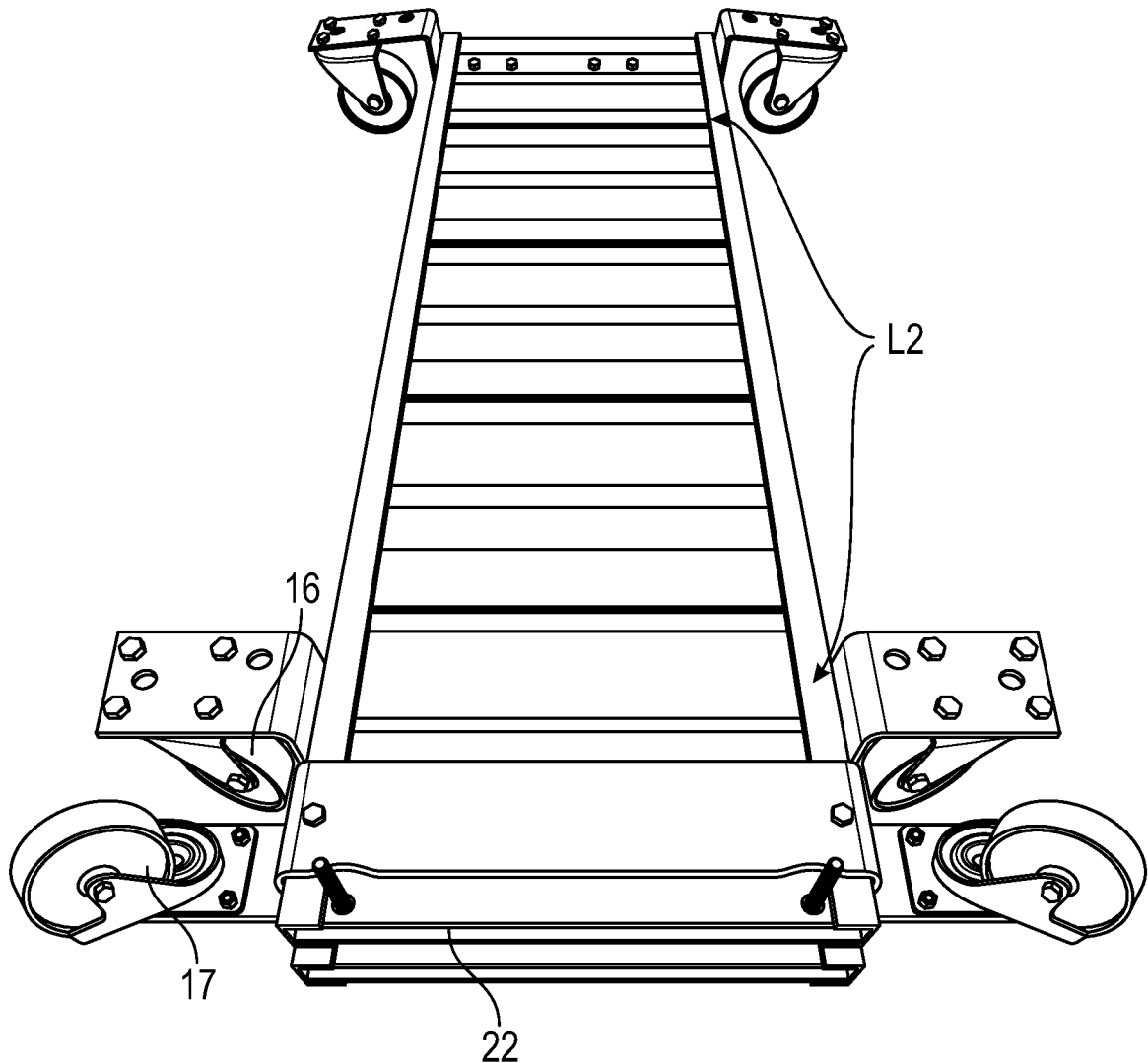
FIG. 2 is a photograph of a perspective view of an undeployed dolly, in accordance with features of the present invention.

Intermediate the first and second ends of the ramp are a means 18 for folding the ramp. Such folding means include a plurality of hinges as depicted, a pin and aperture configuration (wherein the ramps initially couple from their sides), and combinations thereof. The folding means (e.g., the pin and aperture configuration) may allow for the ramp to be dissembled into approximately two lengths. Alternatively, the folding means may be semi-permanent (e.g., hinges) such that a second length L2 folds atop a first length 1, as depicted in FIG. 2. Beneath the end of the second length proximal to the hinge position is a plurality of wheels 19. This third set of wheels provides support for that end of the ramp when the ramp is folded upon itself as described above.

FIG. 2 shows the second end 22 of the ramp (i.e., the end of the ramp furthest from the viewer in FIG. 1) folded on top of and opposing the first end 20 of the ramp. It should be noted that the second in FIG. 2 does not include the wheel chock.

Figure 3:
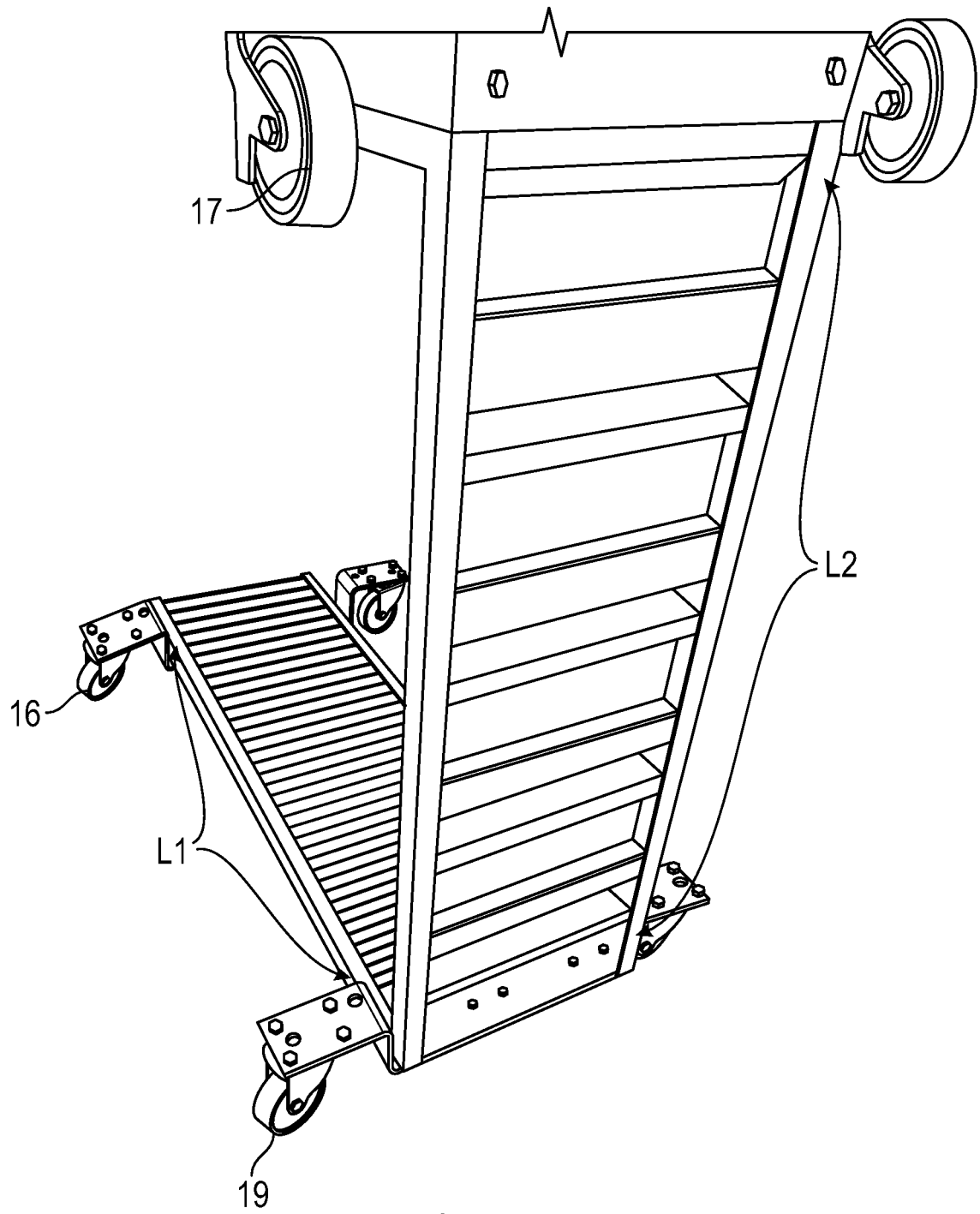
FIG. 3 is a photograph of a perspective view of a dolly being manipulated from a first deployed configuration to a second undeployed configuration, in accordance with features of the present invention.

FIG. 3 shows the invented dolly whereby the second length L2 is being folded atop the first length L1. As can be noted, the changing of the dolly from a first deployed configuration to a second undeployed configuration can be done without any special or common tools. Further, a one handed manipulation is afforded. For further stowability, the sections L1 and L2 may be separated and/or rejoined, also without the need for special tools or common tools.

It should be further noted that the first end 20 of the ramp is not visible in FIG. 2 inasmuch as the second end overhangs the first end. This is evidenced by the second pair of wheels 17 positioned upside down and more distal from the first pair of wheels 16. Such an arrangement confers more compact folding of the ramp so that the heretofore upwardly facing surface of the second length L2 of the ramp opposes the still upwardly facing surface of the first length L1 of the ramp. In an embodiment of the invention, the two opposing surfaces contact each other when the ramp is in its folded configuration.

In summary the invention provides a dolly comprising an elongated surface with a first end and the second end, wherein the surface defines a first section in rotatable communication with a second section; and a first plurality of wheels proximal to the first end and a second plurality of wheels proximal to the second end. The first plurality of wheels supports the first distal end and the second plurality of wheels supports the second distal end.

Figure 5A:
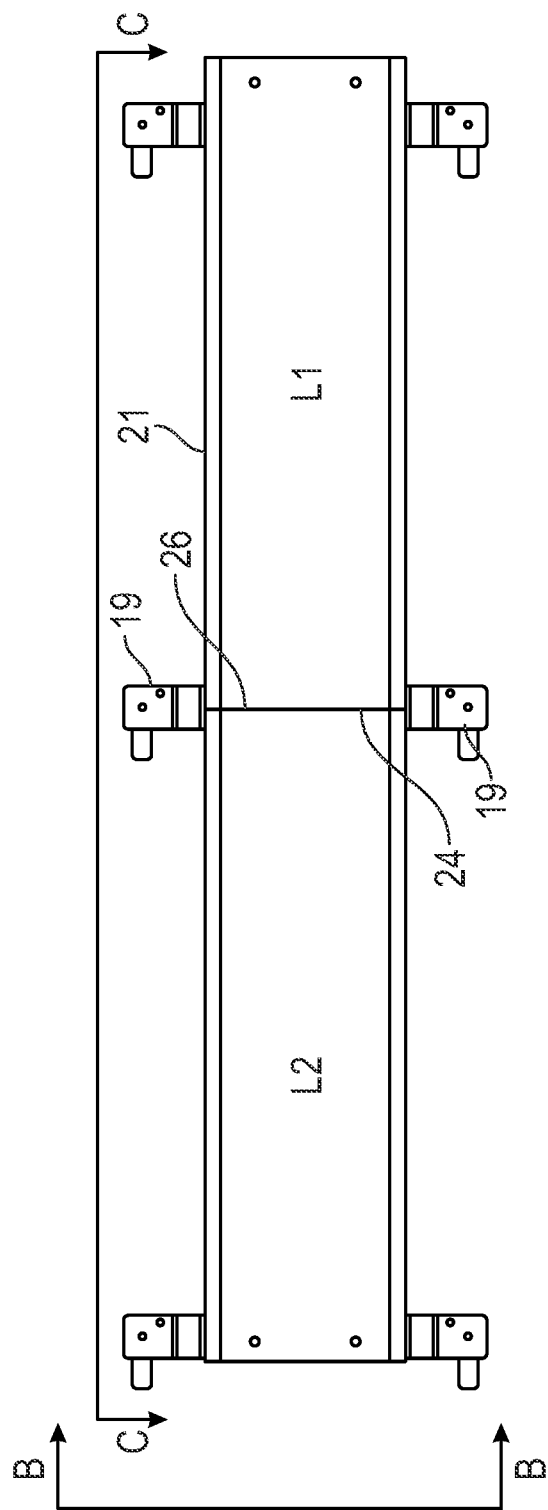
FIG. 5A is a plan view of a fully deployed dolly, in accordance with features of the present invention.

As more clearly shown in FIG. 5A, the dolly has a first deployed configuration wherein the first section or length (L1) has a first proximal end 24 and a first distal end and the second section has a second proximal end 26 opposing the first proximal end and the second section has a second distal end. A third plurality of wheels 19 is positioned beneath the opposing proximal ends.

The dolly has a second undeployed configuration wherein the second section overlays the first section. The third plurality of wheels supports the first proximal end. In this undeployed configuration, the second plurality 17 of wheels is axially displaced from the first plurality 16 of wheels.

The first section and the section are approximately equal in length.

In operation, the ramp is in its fully deployed configuration such that the midpoints of its two lengths or sections oppose each other. The motorcycle is loaded at either end of the ramp.

At the other end of the ramp is positioned a wheel chock. Upon loading, the loaded dolly may be moved along with the rolling stock supported thereby, to wherever the cycle is to be stowed or stored.

Upon unloading, the dolly may be folded at the midpoints of the two opposing sections or lengths. The dolly may then be stowed or hung upon a wall for later use.

Figure 4A:
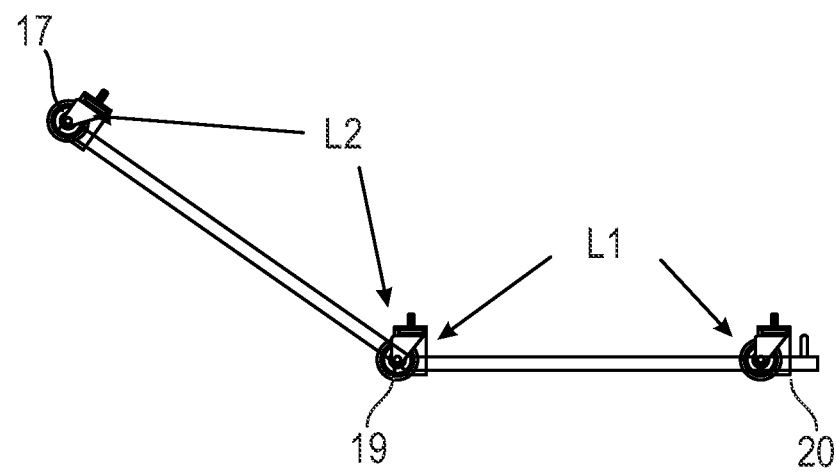
FIG. 4A is a side view of a partially deployed dolly, in accordance with features of the present invention.
Figure 4B:
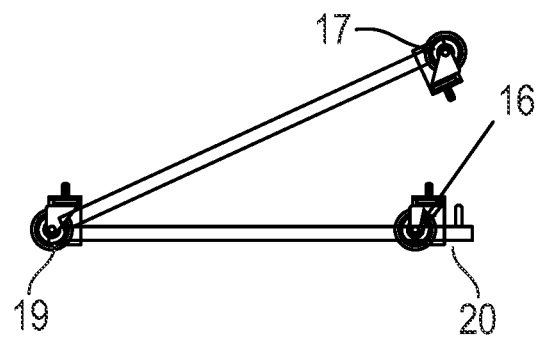
FIG. 4B is a side view of a nearly folded dolly, in accordance with features of the present invention.
Figure 4C:
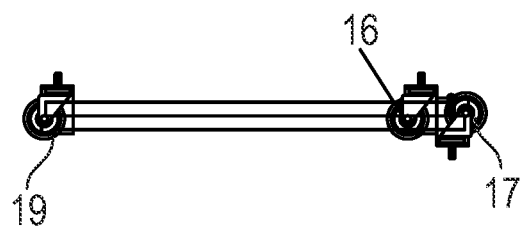
FIG. 4C is a side view of a completely folded dolly, in accordance with features of the present invention.

FIGS. 4A-C are schematic drawings of the invented dolly in various stages of deployment. FIG. 4A shows the dolly nearly fully deployed, with the second length L2 of the dolly [positioned at approximately a 30 degree angle off the horizontal support surface upon which the dolly rests.

FIG. 4B shows the dolly in the final stages of being folded. FIG. 4C shows the dolly completely folded. FIG. 4C shows the feature of the second set of wheels 17 being positioned distal from the first set 16 of wheels so as to axially displaced therefrom, as discussed supra.

Figure 5B:
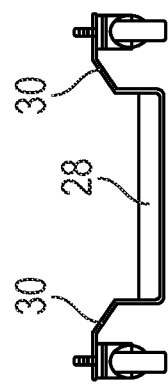
FIG. 5B is an end view of the dolly, taken along line B-B of FIG. 5A.
Figure 5C:
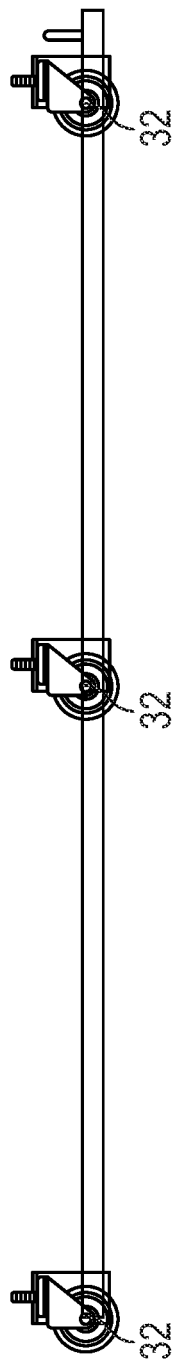
FIG. 5C is a side view of the dolly, taken along line C-C of FIG. 5A.

FIG. 5A-C are schematic drawings of the invented dolly, all of which show the dolly completely deployed. FIG. 5A is a plan view of the dolly, whereby the two lengths L1 and L2 are depicted. Also shown are the two medial edges 24, 26 of the lengths opposing each other. It is at this juncture where the means for folding the substrate are located.

FIG. 5B is an end view of the dolly. This view clearly depicts the motorcycle support surface 28 disposed between the wheels of the device. In an embodiment of the invention, the surface is countersunk relative to the longitudinally and generally vertically extending walls 30 defining the periphery of the support surface. These walls are adapted to receive a standard wheel chock via a clamping arrangement, or a rod and aperture arrangement as discussed supra FIG. 5C is a side view of the dolly without the vertical peripheral walls of the support surface shown. This view shows how the latitudinally extending axles 32 of each of the three pluralities of wheels are roughly coplanar with the upwardly facing support surface 28. Generally, the axles are orthogonal to the longitudinal axis of the dolly.

Figure 6C:
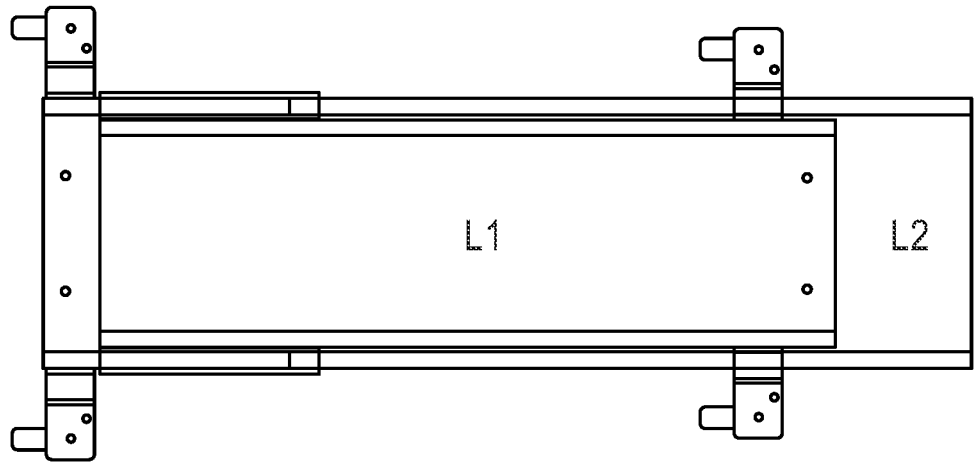
FIG. 6C is a plan view of an undeployed dolly having a telescoping retraction feature, in accordance with features of the present invention.

Aside from the two halves of the ramp being in rotating communication with each other, instead the halves may slidably communicate with each other along the longitudinal axis of the ramp. FIGS. 6A-D show this telescoping feature, wherein the halves slide in an axial direction, relative to each other. FIG. 6A shows the first section or length L1 of the ramp in the first stages of being slidingly received axially by the second length L2 of the ramp (see dashed arrow) such that the first length L1 is positioned between the side rails 30 of that section of the ramp defining the second length L2. As is the embodiment described supra, a third plurality of wheels may be positioned beneath the opposing proximal ends 24, 26 of the two coaxially aligned sections. FIG. 6B is a side view of this configuration.

Figure 6D:
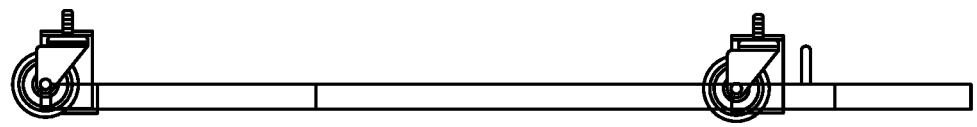
FIG. 6D is a side view of the undeployed dolly depicted in FIG. 6C.

FIG. 6C shows the first section or length L1 of the ramp fully nested between the side rails of the second section or length L2. FIG. 6D is a side view of the fully nested, undeployed configuration.

Figure 7:
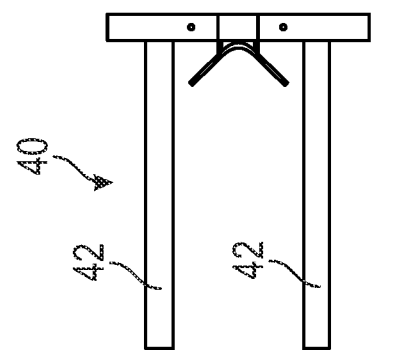
FIG. 7 is a plan view of a fully deployed dolly and a standard wheel chock, in accordance with features of the present invention.
Figure 7:
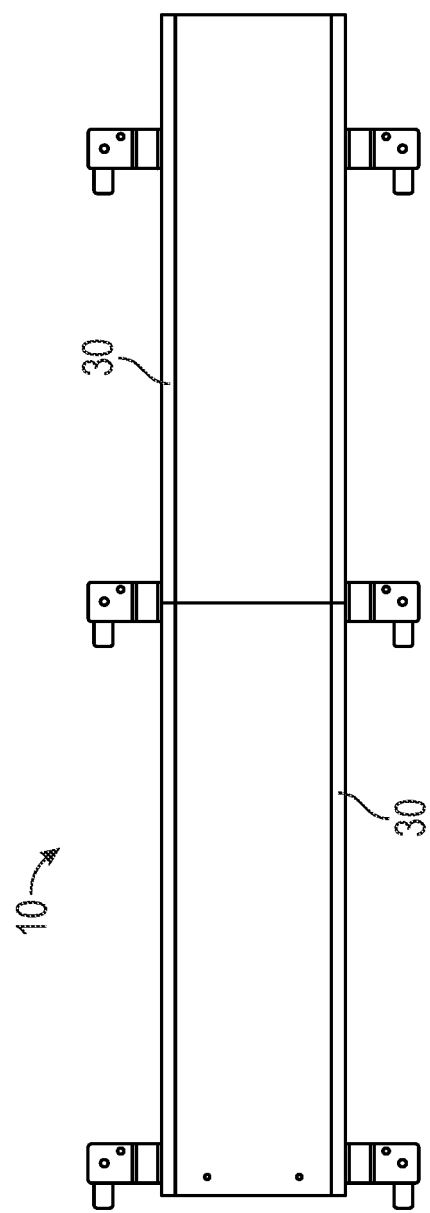

FIG. 7 is a plan view of the invented dolly 10 shown with a standard wheel chock 40. The chock 40 is shown as positioned at either end of the dolly. The first end and the second end of the dolly are adapted to removably receive a wheel chock. However, typically only one chock is employed per ramp. The chock may be reversibly fastened to the side rail of the ramp and as such, in slidable communication with longitudinally extending portions of the rail, later to be locked in place anywhere along the length of the rails. Alternatively, the chock may be adapted to be received only at the ends of the elongated substrate. In an embodiment of the invention, the cross section of the side rails 30 of the dolly may be configured so as to slidably receive anchor substrates 42 of the chocks, the substrates having a cross section slightly larger so as to slide over the side rails of the dolly.

Figure 8A:
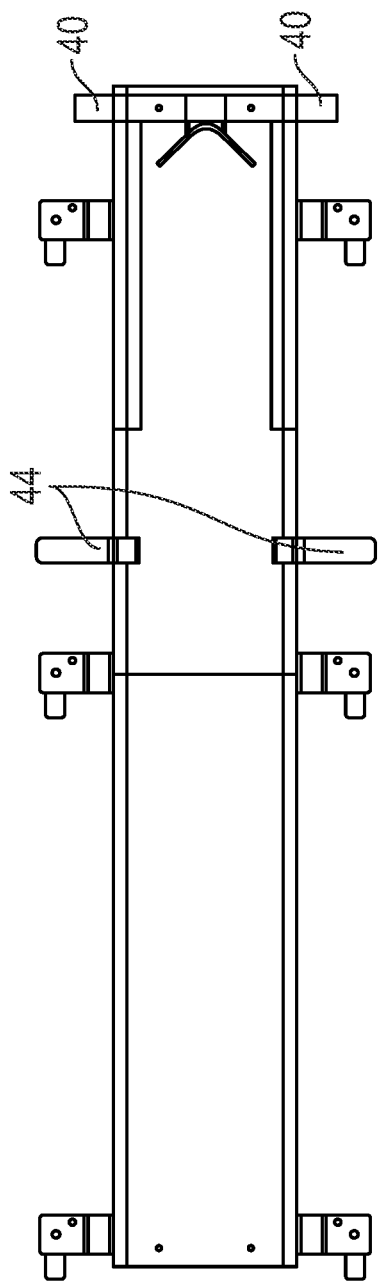
FIG. 8A is a plan view of a fully deployed dolly with nested wheel chock and foot pegs, in accordance with features of the present invention.

FIG. 8A is a plan view of a fully deployed dolly with nested wheel chock and foot pegs 44. The pegs 44 provide a means for the user to push the front of her bike away from the wheel chock and therefore the front F of the dolly upon unloading. After usage, the pegs 44 may be stowed underneath or within apertures formed by the wheel chock.

In addition, an additional pair of pegs may be added to rearward portions R of the dolly to facilitate pushing the motorcycle into a fully nested position with the wheel chock. Alternatively, the first pair of pegs 44 may be removably received or adapted to slide along longitudinally extending regions of the side rails to facilitate docking or undocking of the motorcycle vis-á-vis the wheel chock 40, as the case may be. In this alternative case, a means for reversibly securing the pegs to the rails is provided, such as a threaded wing nut received by a threaded aperture of the peg so as contact and frictionally engage an opposing surface of the side rail when the user so actuates the nut.

Figure 8B:
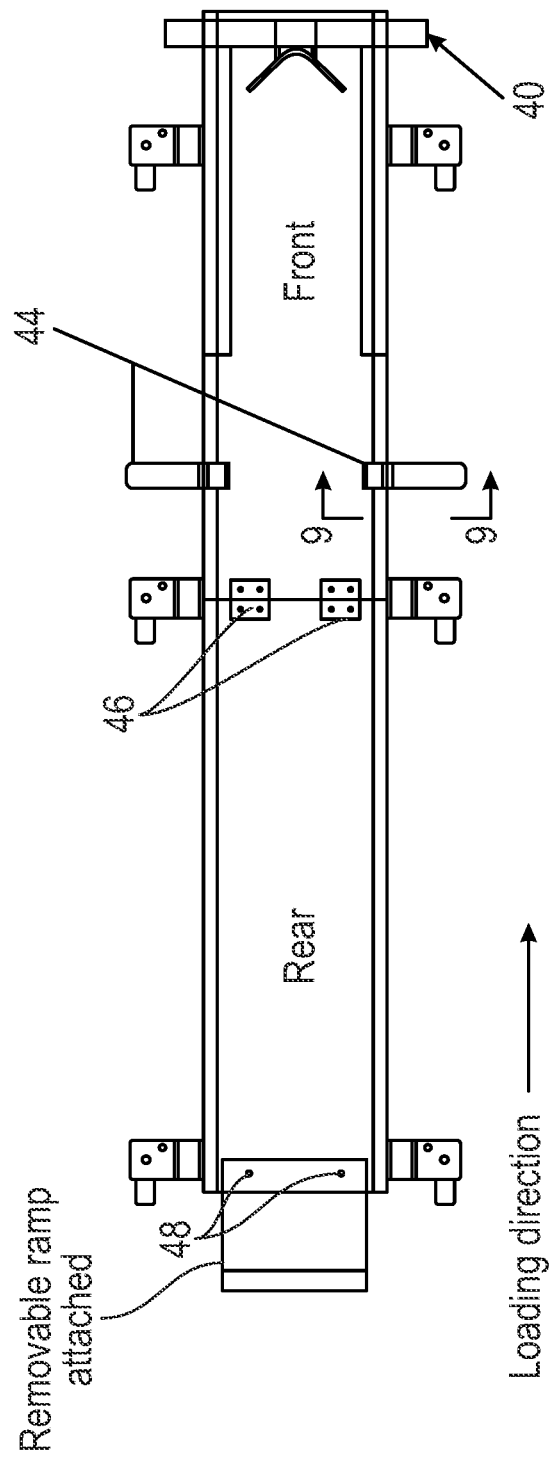
FIG. 8B is a plan view of a fully deployed dolly with a nested wheel chock at a first end and a ramp positioned at a second end, in accordance with features of the present invention.

FIG. 8B is a plan view of a fully deployed dolly with a nested wheel chock at a first end and a ramp 48 positioned at a second end. The ramp 48 may be slidably received at the second end, similar to how the wheel chock docks at the first end. Practical aspects of dolly operation dictate that the ramp be positioned at an end of the dolly opposite the end of the dolly end having the wheel chock. However, the ramp and/or the ramp may initially be positioned at either end of the dolly.

FIG. 8B further depicts a rear panel of the dolly in hingeable communication with a front panel of the dolly. A plurality of hinges 46 are disposed between opposing ends of the front and rear panel. The hinges may be arranged so that the motorcycle wheel support surface sides of the dolly folds together at the midline of the dolly. This will allow the user to still utilize the wheels supporting the dolly on the floor to roll the dolly to a place for stowage.

FIG. 8C is a plan view of the dolly with the ramp 48 shown detached from the rear of the dolly. Proximal to the edge of the rear of the dolly are a first plurality of holes 50 adapted to receive a bolt and nut combination to facilitate attachment of the ramp 48. For example, the ramp 48 may feature a second plurality of holes 52 which overlie or underlie in registration with the first plurality of holes.

At the opposite or front end of the ramp, a plurality of upwardly directed studs 51 may be provided having the same cross section diameter as the holes comprising the first plurality of holes 50. The purpose of these stud 51 is multi-fold and includes a means for docking the wheel chock to that end of the dolly. In such instances, the wheel chock will feature holes in registration with the studs so as to slidably receive the studs.

Another purpose of the studs 51 is to mate with the first plurality of holes at the opposed end of the dolly when the dolly is folded up after use. For further securement, one or more of the studs may have a transversely extending aperture proximal to the tip of the studs, the transversely extending aperture adapted to receive a cotter pin, key or other means for reversibly securing the folded dolly.

Alternatively, the tips of the studs may be threaded so as to receive a threaded wingnut for similar securement of the folded dolly halves.

FIG. 8D is a side view of the ramp 48. The ramp is shown with a plurality of surfaces. For example, the ramp may feature a first surface 54 which, when the ramp is attached to the dolly, would be in parallel registration with the motorcycle tire contacting surface of the dolly. A second surface 56 of the ramp would extend from the floor supporting the casters of the ramp, to the first surface 54. As such, a forward edge of the second surface 56 would intercept a rear edge of the first surface at an angle θ greater than 180 degrees.

A depending surface of the ramp may feature a stud 51 to be matingly received by one of the apertures 50 located proximal to the rear edge of the rear panel of the dolly. As with the studs located at the front edge of the dolly, cross sections of the ramp studs may feature a cotter key configuration, or a threaded bolt and wing nut configuration. Alternatively, no attachment means for the studs of the ramp may be used so as to afford quick attachment and detachment of the ramp before and after use.

A trailing edge of the downwardly facing surface of the multiplanar ramp may further comprise a wedge 58 to provide further support to that rearward edge. The wedge may extend the entire width of the ramp. Depending surfaces of the wedge may further define anti-slipping topography, such as ridges, or roughed surfaces, to enhance the friction engagement with the floor upon which the ramp and the dolly rest.

The friction enhancing surfaces of the wedge may work in conjunction with locking mechanisms 53 situated at each or at some of the wheels 16, 17, 19 of the dolly, so as to prevent movement during cycle loading and unloading.

Figure 9A:
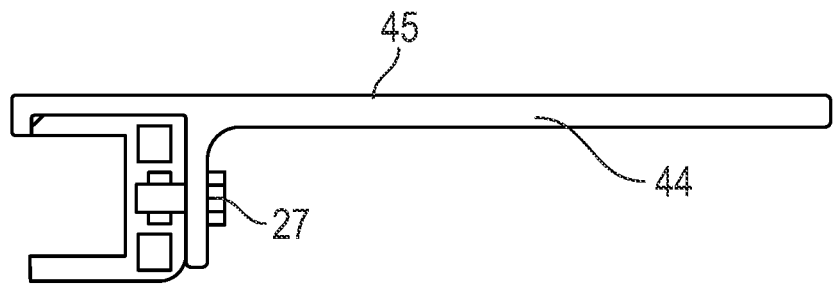
FIG. 9A is a view of FIG. 8B taken along line 9-9 showing foot peg engagement with a side edge of the dolly, in accordance with features of the present invention.
Figure 9B:
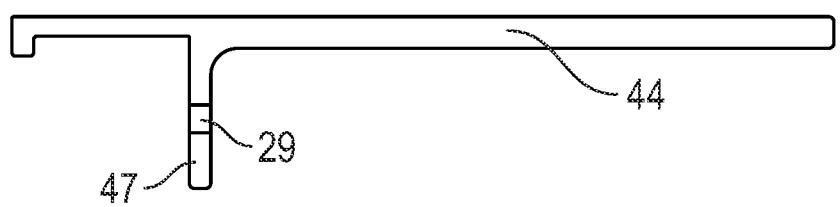
FIG. 9B shows a side view of the peg 44 not engaged with the edge 21.

FIG. 9A is a view of FIG. 8B taken along line 9-9. It shows the bottom peg 44 engaged with a longitudinally extending edge 21 of the front panel L1 of the dolly. FIG. 9B shows a side view of the peg 44 not engaged with the edge 21.

Figure 9C:
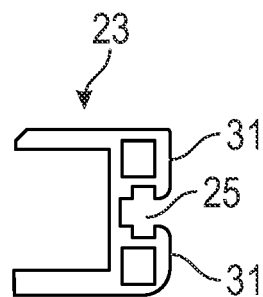
FIG. 9C shows a cross section of the edge 21 defining a nut slide.

FIG. 9C shows a cross section of the edge 21 defining a nut slide, generally designated as 23. The nut slide 23 comprises a laterally facing surface 31 forming an aperture 25 adapted to receive a bolt, nut or other fastener 27 as shown in FIG. 9A.

As shown in FIG. 9B, the peg 44 comprises a horizontally extending portion 45 and a depending substrate 47. That depending substrate has a region forming a transverse aperture 29, through which the aforementioned fastener 27 slides.

The nut slide may be integrally molded with the edge 21 and along the entire length of the front panel L1 or rear panel L2. This allows the peg to be slid along the length of the edge to accommodate users having different leg lengths. Generally, the pegs would be utilized by the user to either couple or de-couple her bike to or from the wheel chock. Once the desired peg position is determined, the fastener 27 may be tightened, thereby reversibly holding the peg in place against the edge 21

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. While the dimensions and types of materials described herein are intended to define the parameters of the invention, they are by no means limiting, but are instead exemplary embodiments.

Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the terms "comprising" and "wherein." Moreover, in the following claims, the terms "first," "second," and "third," are used merely as labels, and are not intended to impose numerical requirements on their objects. Further, the limitations of the following claims are not written in means-plus-function format and are not intended to be interpreted based on 35 U.S.C. § 112, sixth paragraph, unless and until such claim limitations expressly use the phrase "means for" followed by a statement of function void of further structure.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," "more than" and the like include the number recited and refer to ranges which can be subsequently broken down into subranges as discussed above. In the same manner, all ratios disclosed herein also include all subratios falling within the broader ratio.

One skilled in the art will also readily recognize that where members are grouped together in a common manner, such as in a Markush group, the present invention encompasses not only the entire group listed as a whole, but each member of the group individually and all possible subgroups of the main group. Accordingly, for all purposes, the present invention encompasses not only the main group, but also the main group absent one or more of the group members. The present invention also envisages the explicit exclusion of one or more of any of the group members in the claimed invention.

The embodiment of the invention in which an exclusive property or privilege is claimed is defined as follows:

1. A dolly defining a first deployed configuration and a second undeployed configuration, the dolly comprising: a single elongated surface ramp adapted to receive an inline vehicle, the ramp having a first end and a second end, wherein in the first deployed configuration the single elongated ramp defines a first section having a first length L1 with an upwardly facing first surface in communication with a second section having a second length L2 with an upwardly facing second surface and in the undeployed configuration the upwardly facing first surface opposes the upwardly facing second surface; a first plurality of wheels proximal to the first end and a second plurality of wheels proximal to the second end, wherein axles supporting the wheels are coplanar with the upwardly facing first surface and upwardly facing second surface; wherein the first and second sections each having longitudinally extending raised sides which provide lateral support to a wheel or foot pegs;

and wherein the first and second sections slidably receive a wheel chock which is reversibly locked in place so as to lock a wheel in place.

2. The dolly as recited in claim 1 such that in the first deployed configuration the first section has a first proximal end and a first distal end and the second section has a second proximal end opposing the first proximal end and the second section has a second distal end.

3. The dolly as recited in claim 2 wherein the first plurality of wheels supports the first distal end and the second plurality of wheels supports the second distal end.

4. The dolly as recited in claim 2 wherein a third plurality of wheels is positioned beneath the opposing proximal ends.

5. The dolly as recited in claim 2 wherein a third plurality of wheels supports the first proximal end.

6. The dolly as recited in claim 1 wherein the first section and the second section are approximately equal in length.

7. The dolly as recited in claim 1 wherein the second plurality of wheels is axially and distally positioned relative to the first plurality of wheels.

8. The dolly as recited in claim 1 wherein the first section is in rotatable communication with the second section.

9. The dolly as recited in claim 1 wherein the first section is in slidable communication with the second section.

10. The dolly as recited in claim 9 wherein the first section moves in an axial direction relative to the second section.

11. The dolly as recited in claim 1 wherein the dolly is adapted to be deployed and un-deployed with one hand by a user.

12. The dolly as recited in claim 1 wherein the dolly, when loaded with the inline vehicle, can be manually moved.

13. The dolly as recited in claim 1 wherein a motorcycle can be loaded and unloaded from either end of the single elongated ramp.

* * * * *